United States Patent Office 3,364,111
Patented Jan. 16, 1968

3,364,111
CARBOXYMETHYLATED DEXTRAN
FOR PEPTIC ULCERS
Eiji Morii, Nishi-ku, Nagoya, Setsuo Tomizawa, Tokyo, Shunzo Katoh, Higashi-ku, Nagoya, Kouichi Iwata, Nishi-ku, Nagoya, Kyoji Kito, Moriyama-ku, Nagoya, and Kozo Yamada and Fumio Kuzuya, both of Showa-ku, Nagoya, Japan, assignors to Meito Sangyo Kabushiki Kaisha, Nishi-ku, Nagoya, Japan
No Drawing. Filed Nov. 15, 1965, Ser. No. 507,665
Claims priority, application Japan, Nov. 20, 1964, 39/65,235
10 Claims. (Cl. 167—55)

This invention is based upon a discovery in which it is found that an antipeptic activity of a carboxymethylated polysaccharide or its salt increases as the degree of substitution or the degree of polymerization increases and that each of them reveals a remarkable antipeptic activity particularly in the stomach in the presence of an antacid, and it more particularly relates to a composition for peptic ulcers containing and consisting of an effective dose of at least one kind of compound selected from the group which is composed of a carboxymethylated polysaccharide and a salt thereof, particularly a composition for peptic ulcers containing and consisting of at least one kind of said compound and an antacid, and a method of administration thereof for peptic ulcers characterized by oral administration of a composition for peptic ulcers containing and consisting of an effective dose of at least one kind of compound selected from the group which is composed of a carboxymethylated polysaccharide and a salt thereof, most preferably a composition for peptic ulcers containing and consisting of at least one kind of said compound and an antacid.

It has been known that an acid polysaccharide, particularly a natural or synthetic sulfated polysacchride represented by heparin, has many physiologically important actions such as lipemia clearing action, diuretic action, restraining action to activity of various enzymes and experimental peptic ulcers as well as blood anticoagulant action.

However, when such a sulfated polysaccharide is utilized as a medicine the object of which is an action other than blood anticoagulant one, in particular as a medicine for peptic ulcers, it is fully estimated that the blood anticoagulant action thereof results in a fatally harmful effect.

An object of the present invention is, therefore, to make clear an acid polysaccharide which has a remarkable restraining action to proteolytic activity of pepsin and experimental peptic ulcer and has almost no harmful effect such as blood anticoagulant action and to provide medicines for peptic ulcers comprising those polysaccharides or consisting of those and an antacid and a method of administration thereof.

Further objects and advantages of this invention will be obvious from the contents of the specification hereinafter disclosed.

The objects and advantages of this invention are, then, achieved by an alkali metal salt of a carboxymethyl dextran, carboxymethyl glycogen, carboxymethyl cellulose, carboxymethyl starch, carboxymethyl amylopectin, and so on, said salt being obtained by a process as follows: a polysaccharide such as dextran, glycogen, cellulose, starch, amylopectin or dextrin is respectively allowed to react with an excess carboxymethylating agent such as sodium or potassium monochloroacetate in an aqueous solution or suspension of the said polysaccharide in the presence of an excess alkali metal hydroxide such as sodium or potassium hydroxide, the reaction liquid being added by an organic solvent miscible with water such as methanol or acetone, then said salt is precipitated, or a free carboxymethyl ether of the polysaccharide, said ether being obtained by a process as follows: an alkali metal salt of one of these carboxymethylated polysaccharides is dissolved in water and adjusted to pH 2.0 with the use of hydrochloric acid or acidulated with a cation exchange resin, and methanol or a ketone miscible with water is added thereto, then said carboxymethyl ether is precipitated, or alkaline earth metal salt or an ammonium salt of these carboxymethylated polysaccharides, which is obtained by a process as follows: a free carboxymethyl ether of these polysaccharides is allowed to react in an aqueous medium with a base suitable to obtain a desired alkali metal salt or ammonium salt, then said salt is precipitated.

That is to say, when we have been studying in vitro a restraining action of acid polysaccharide to proteolytic activity of pepsin, we have unexpectedly found that carboxymethyl dextran has an antipeptic activity, particularly it reveals a remarkable antipeptic activity within a particular range of pH and a carboxymethylate of other polysaccharide such as carboxymethyl glycogen, carboxymethyl cellulose, carboxymethyl starch, carboxymethyl amylopectin or carboxymethyl dextrin also reveals the similar action.

Furthermore, we have also found that there was a definite relation between the medicinal effect and the degree of substitution of carboxymethyl group and/or the intrinsic viscosity (represented hereinafter as $[\eta]$) thereof so that medicinal values as a carboxymethylated polysaccharide attended by the present invention might be advantageously revealed. In addition, we have found that the medicinal values thereof was revealed most advantageously within a pH range of 2.0–4.0, preferably 2.5–3.5.

Furthermore, we have found that it was particularly advantageous when said degree of substitution was at least 0.5, preferably 0.8, and said $[\eta]$ was at least 0.045. Although the upper limit of $[\eta]$ was not particularly defined, if it increased excessively, an acute toxicity tended to increase, and it has been known that an adoption of unnecessary high $[\eta]$ was not required because it did not substantially increase the medicinal value being attended.

As a carboxymethylated polysaccharide, we employed a sodium salt of carboxymethyl dextran having a degree of substitution of 1.3 synthesized from a partially degraded dextran having $[\eta]$ of 0.212, and we investigated in vitro the antipeptic activity thereof at various values of pH. As the result, we found that, as illustrated in Table 1, it formed almost or perfectly no precipitate with protein at pH near 1.5, but in higher pH range of 2.0–4.0, particularly 2.5–3.5, it combined with protein and precipitated, moreover, it revealed an extremely remarkable antipeptic activity in the same manner as in a sulfated polysaccharide such as heparin or dextran sulfate did.

In addition, precipitating agency for protein in the table was represented as the turbidity (absorbancy) of the mixture liquid composed of an aqueous solution of carboxymethyl dextran in 0.05 w./v. percent concentration and an aqueous solution of dried human plasma in equal concentration being adjusted to the desired pH with the use of 1 N or N/10 aqueous solution of hydrochloric acid and allowed to stand for 60 minutes at 20° C. The absorbancy was determined at 660 m$\mu$ by means of an electrophotometer (type EPW-4, made in Hitachi Seisakusho, Japan), employing a 10 mm. cell. Antipeptic activity was determined according to Bonfils' method (S.

Bonfils et al.: Rev. Franc Etudes Clin. Et. Biol. 5) improved as mentioned below.

A carboxymethyl dextran salt and dried human plasma were dissolved with the use of N/100 aqueous solution of hydrochloric acid so that each concentraiton was 1.25 w./v. percent and 2.5 w./v. percent respectively. Meanwhile pepsin (this pepsin digested 10,000 times its weight of freshly coagulated egg albumin in 2 hrs. at 50° C. in water acidulated with HCl) was dissolved in N/1000 aqueous solution of hydrochloric acid so that its concentration was 0.025 w./v. percent, then after 1 ml. of each solution was admixed in order of carboxymethyl dextran, pepsin and aqueous solution dried human plasma, the mixture liquid was adjusted to desired pH with the use of 1 N or N/10 aqueous solution of hydrochloric acid. Immediately after it was incubated at 25±0.05° C. exactly for 1 hr., 10 ml. of 10 w./v. percent solution of trichloroacetic acid was added, and the mixture was allowed to stand for 15 min. at the above-mentioned temperature again. The produced precipitate was filtered off, and to 1 ml. of the filtrate there were added 10 ml. of 0.55 M aqueous solution of sodium carbonate and 3 ml. of Folin-Ciocalteu reagent, and the mixture was allowed to stand for 30 min. at the above-mentioned temperature. Optical density (absorbency) was read at 660 mμ with this liquid by means of the above mentioned electrophotometer using a 10 mm. cell and thus this value was given the designation S. The control experiment was carried out at the same time with 1 ml. of distilled water instead of the solution of carboxymethyl dextran, and the value of the control was designated as C. In addition, as a blank test, a value B was determined with 1 ml. of a filtrate by the similar operation as mentioned above, the said filtrate being obtained by the following procedure: 1 ml. of aqueous solution of dried human plasma, 1 ml. of distilled water, 10 ml. of 10 w./v. percent aqueous solution of trichloroacetic acid and, at last, 1 ml. of aqueous solution of pepsin were admixed, the mixture was then allowed to stand at 25±0.05° C. for 15 min. and filtered. Antipeptic activity was then calculated by the following equation:

$$\text{Antipeptic activity (percent)} = \frac{(C-B)-(S-B)}{C-B} \times 100$$

Thus the antipeptic activity of a carboxymethylated polysaccharide in the present invention depends remarkably upon pH. At pH near 1.5, almost no antipeptic activity is revealed. Accordingly, so that the restraining action for peptic ulcer of those acid polysaccharides may be revealed sufficiently in the stomach, it is desired in particular to control the pH in the stomach up to the most suitable level with the use of a suitable amount of an antacid. Of course, the restraining action for peptic ulcer can be revealed even if no antacid is employed together; however, in this case, considerably large amount thereof should be administered, or the administration should be carried out when pH in the stomach is in a suitable range. Accordingly, the use of said antacid is more desirable with respect to administration amount and/or administration time.

From such a point of view, we employed as an antacid, for example, heavy magnesium oxide, magnesium hydroxide, calcium carbonate, sodium bicarbonate, synthetic aluminum silicate, dried aluminum hydroxide gel, hydroxide aluminum magnesium co-dried gel or magnesium aluminate silicate, and we examined in vitro their effects on the antipeptic action of a carboxymethylated polysaccharide.

As an antacid suitable for use in the present invention, there can be illustrated at least one kind of antacid selected from the group consisting of: magnesium oxide; a hydroxide of the metal selected from the group consisting of calcium, magnesium and aluminum; a bicarbonate of the metal selected from the group consisting of sodium and potassium; a carbonate of the metal selected from the group consisting of calcium and magnesium; a silicate of the metal selected from the group consisting of magnesium and aluminum; a coprecipitated compound consisting of aluminum hydroxide and magnesium carbonate or hydroxide, or consisting of aluminum hydroxide, magnesium carbonate and calcium carbonate; and an aluminate silicate of the metal selected from the group consisting of sodium, calcium and magnesium.

For the purpose of the above-mentioned examination, sodium carboxymethyl dextran having $[\eta]$ of 0.323 and a degree of substitution of 1.3 was employed as a carboxymethylated polysaccharide. Each 5 ml. of 2.5 w./v. per-

TABLE 1

| Antipeptic action | pH | | | | | | |
|---|---|---|---|---|---|---|---|
| | 1.5 | 2.0 | 2.5 | 3.0 | 3.5 | 4.0 | 4.5 |
| Precipitating agency for protein (−log T) | 0 | 0.054 | 0.650 | 0.680 | 0.554 | 0.255 | 0.103 |
| Antipeptic activity (percent) | 0 | 7.5 | 51.0 | 72.5 | 54.0 | 30.5 | 25.0 |

In addition, in the case of carboxymethylated compounds such as glycogen, cellulose, starch, amylopectin, or dextrin, perfectly no antipeptic activity thereof was found at pH near 1.5 in the same manner as mentioned above, however, considerable antipeptic activity was revealed, for instance, at pH 3.0.

TABLE 2

| Acid polysaccharide (Sodium Salt) | Chemical Property | | Antipeptic activity, percent |
|---|---|---|---|
| | $[\eta]$ | Degree of substitution | |
| Carboxymethyl Glycogen | 0.176 | 0.80 | 62.5 |
| Carboxymethyl Cellulose | 4.97 | 0.72 | 42.5 |
| Carboxymethyl Starch | 0.262 | 0.87 | 62.7 |
| Carboxymethyl Amylopectin | 1.31 | 0.63 | 53.3 |
| Carboxymethyl Dextrin | 0.166 | 1.03 | 58.1 | cent aqueous solution of this compound and 5 w./v. percent aqueous solution of dried human plasma and 10 ml. of N/1000 aqueous solution of hydrochloric acid containing 25 mg. of pepsin were added to 10 ml. of 3/100 N aqueous solution of hydrochloric acid in which a necessary amount of the above-mentioned antacid for neutralizing 10 ml. of 3/100 N aqueous solution of hydrochloric acid to pH 3 was dissolved, respectively, and at last, the pH of the mixture was adjusted exactly to 3.0, then the antipeptic activity of this solution was determined.

According to the results obtained above, as shown in Table 3 below, it is known that in case any kind of antacid is employed, there is obtained a nearly equal antipetic activity, namely 75.0%, to one shown by the so-called control solution containing no antacid and merely adjusted to pH 3.0. In other words, it is known that in case any kind of antacid is employed, much better antipeptic activity is revealed than in case such a carboxymethylated polysaccharide is allowed to act in the stomach without the use of an antacid.

TABLE 3

| Coexisting Antacid | Amount of antacid in the examined liquid [mg./30 ml.] | Antipeptic activity (percent) |
|---|---|---|
| Heavy Magnesium Oxide | 6.0 | 70.3 |
| Magnesium Hydroxide | 11.1 | 75.0 |
| Calcium Carbonate | 14.3 | 72.3 |
| Sodium Bicarbonate | 25.0 | 77.5 |
| Synthetic Aluminum Silicate | 60.0 | 75.3 |
| Dried Aluminum Hydroxide Gel | 10.3 | 77.1 |
| Hydroxide Aluminum Magnesium Co-dried Gel | 10.3 | 73.1 |
| Magnesium Aluminate Silicate | 15.0 | 73.1 |

Although such an antacid controls the pH of gastric juice, it should be understood that each kind of antacid has different easiness to controlling. Particularly, aluminate silicates, above all magnesium aluminate silicate is a preferable antacid. Of course, it can be employed in combination as well as singly. When it is employed, an amount required for adjusting pH within the aforesaid range may be sufficient.

Based upon such an invention, we have thoroughly investigated how the intrinsic viscosity, namely $[\eta]$, and the degree of substitution of a carboxymethylated polysaccharide relate to antipeptic activity at pH 3 in vitro, and toxicity and, in addition, anticoagulant activity, that is to say, we have investigated the relation employing sodium salts of carboxymethyl dextran having a value of $[\eta]$ nearly equal to 0.05 and different degrees of substitution, respectively, and those having a degree of substitution nearly equal to 1.2 and difference values of $[\eta]$. According to the results, it is found that although an antipeptic activity of carboxymethyl dextran increases, as shown in Table 4 and Table 5, the antipeptic activity of carboxymethyl dextran increases as the degree of substitution thereof increases, while said activity is not so much influenced by the intrinsic viscosity $[\eta]$ thereof. Furthermore, higher values of $[\eta]$ than a definite limit, or 0.045, is required in particular to reveal the action intended by the present invention. Also it is found that, as illustrated in Table 5, the action increases with $[\eta]$ up to a value at which the highest antipeptic activity is revealed. However at higher values, the antipeptic activity is scarcely influenced, acute toxicity is increased in vain, and in addition, there is also seen a slightly increased anticoagulant action though its value is negligible.

The value of degree of substitution in the table was obtained according to Eyler's calorimetric method (Eyler, R. W., et al.; Anal. Chem. 19, 24, 1960), and $[\eta]$ was determined in 1 N aqueous solution of sodium chloride at 25±0.05° C. by means of Ubbelhode's viscometer. For reference $[\eta]$ mentioned in the present invention means one determined by the above-mentioned method. In addition, an acute toxicity $LD_{50}$ was obtained according to Behrens Karber's method after an intravenous injection into a mouse was carried out.

TABLE 4

| Carboxymethyl dextran (sodium salt) degree of substitution | Antipeptic activity (percent) | Acute toxicity $LD_{50}$ (mg./kg.) |
|---|---|---|
| 0.705 | 3.4 | 3,100 |
| 1.09 | 30.5 | 2,500 |
| 1.96 | 49.0 | 375 |

TABLE 5

| Carboxylmethyl Dextran (Sodium Salt) $[\eta]$ | Antipeptic Activity (percent) | Acute toxicity $LD_{50}$ (mg./kg.) |
|---|---|---|
| 0.045 | 24.9 | 2,500 |
| 0.089 | 57.6 | 2,000 |
| 0.129 | 70.6 | 1,800 |
| 0.301 | 71.8 | 1,300 |
| 0.642 | 68.0 | 800 |
| 0.840 | 66.5 | 625 |
| 1.26 | 65.0 | 500 |
| 2.40 | 60.1 | 300 |

Furthermore, we selected, as a carboxymethylated polysaccharide, a carboxymethyl dextran having $[\eta]$ of 0.323 and a degree of substitution of 1.3, and employed a sodium salt thereof, an aqueous solution of which was dealt with a cation exchange resin, then there was produced an aqueous solution of free carboxymethyl ether. From this solution and each of hydroxides of potassium, ammonium, calcium or magnesium, there were prepared salts such as potassium salt, ammonium salt, calcium salt and magnesium salt, of carboxymethyl dextran and their antipeptic activities in vitro at a pH of 3.0 were determined. From the results, as illustrated in Table 6, it is known also that an antipeptic activity of a salt of carboxymethyl dextran is better in case the salt is a water soluble one such as sodium salt, potassium salt or ammonium salt than in case the salt is water insoluble.

TABLE 6

| Carboxymethyl dextran salt: | Antipeptic activity (percent) |
|---|---|
| Sodium salt | 75.0 |
| Potassium salt | 73.8 |
| Ammonium salt | 74.5 |
| Calcium salt | 33.4 |
| Magnesium salt | 65.9 |

Thus we have known that an antipeptic activity of an alkali metal salt, an ammonium salt or an alkaline metal salt of a carboxymethylated polysaccharide having a intrinsic viscosity $[\eta]$, higher than a certain value and a degree of substitution as large as possible was remarkably revealed in vitro within a pH range of 2.0–4.0, preferably 2.5–3.5. In addition, in order to examine an effect of such a carboxymethylated polysaccharide for restraining an experimental peptic ulcer, for instance an ulcer of Shay rat (H. Shay, Gastroenterology, 5, 43, 1945), we employed various sodium salts of carboxymethyl dextran having $[\eta]$ of approximately 0.3 and different degree of substitution, respectively, and those having a degree of substitution of approximately 1.2 and different values of $[\eta]$, and we investigated thoroughly the relation between the amount of administration thereof and the number of ulcers. The administration of a dose was carried out in such a manner that an aqueous solution thereof was introduced into the stomach by means of stomach tube, immediately after the pyloric end of the stomach was ligated. Further, for one dose of the medicine, five male rats of Wistar descent were employed, and the number of ulcers was represented as an average number of the five ones. The results are illustrated in Tables 7 and 8.

TABLE 7

| Degree of substitution | Dose (mg./kg.) | | | | | |
|---|---|---|---|---|---|---|
| | 25 | 50 | 100 | 200 | 300 | 500 |
| 0.75 | 28.8 | 24.6 | 10.2 | 4.8 | 0.8 | 0 |
| 0.94 | 28.4 | 20.8 | 4.2 | 1.8 | 0 | 0 |
| 1.27 | 26.2 | 14.6 | 2.2 | 0 | 0 | 0 |
| 1.44 | 24.4 | 10.8 | 1.2 | 0 | 0 | 0 |
| 1.59 | 21.6 | 6.2 | 0 | 0 | 0 | 0 |
| 1.79 | 20.0 | 3.4 | 0 | 0 | 0 | 0 |

Control: 30.2.

TABLE 8

| Intrinsic viscosity | Dose (mg./kg.) | | | | | |
|---|---|---|---|---|---|---|
| | 25 | 50 | 100 | 200 | 300 | 500 |
| 0.045 | 29.4 | 26.2 | 18.4 | 7.2 | 1.8 | 0 |
| 0.089 | 29.0 | 24.1 | 10.2 | 4.8 | 0.8 | 0 |
| 0.129 | 28.5 | 21.3 | 4.6 | 2.0 | 0 | 0 |
| 0.301 | 28.4 | 20.8 | 4.2 | 1.8 | 0 | 0 |
| 0.642 | 28.6 | 22.0 | 6.9 | 3.2 | 0 | 0 |
| 1.260 | 28.9 | 23.1 | 8.5 | 4.0 | 0 | 0 |

Control: 30.2.

As illustrated in Tables 7 and 8, from the relation between the amount of administration and the number of ulcers broken out, it is known that an effect of restraining peptic ulcer of Shay rat is increased as the degree of substitution increases, but not so much influenced by the intrinsic viscosity, in the same manner as in the results of experiments in vitro. Further, from the results of Tables 7 and 8 illustrated above, it is known that a carboxymethylated polysaccharide may be employed in an independent administration as a curing medicine for antipeptic ulcer when an amount of administration is increased to some extent corresponding to the degree of substitution and the degree of polymerization thereof.

As obviously seen from the above-mentioned, it is known that there is advantageously desired a carboxymethylated polysaccharide wherein the degree of substitution of carboxymethyl group is higher than at least 0.5, preferably 0.8, and [$\eta$] is at least 0.045. In addition, it should be understood that the combination of these factors is variously selected according to the kind of a polysaccharide employed. In general, it should be selected in such a manner that when the degree of substitution is high [$\eta$] may be low, and when the degree of substitution is low [$\eta$] should be high. Of course, it should be understood that the theoretically highest degree of substitution is 3.0.

Further, we examined an effect of such a carboxymethylated polysaccharide on restraining peptic ulcer in the presence of an antacid, that is to say, we employed sodium salts of carboxymethyl dextran having [$\eta$] of approximately 0.3 and different degrees of substitution, respectively, and examined the results when 25 mg./kg. or 50 mg./kg. of magnesium aluminate silicate was administered together with said sodium salt. From the results, as illustrated in Tables 9 and 10, it is known that, in any case of carboxymethyl dextran, the breakout of peptic ulcer is remarkably decreased by the use of less amount of administration than one in case each of them is independently administered and the tendency is increased as the amount of antacid administered is increased.

TABLE 9

[In case of 25 mg./kg. of magnesium aluminate silicate is administered together]

| Carboxymethyl dextran (sodium salt) degree of substitution | Dose (mg./kg.) | | | | | |
|---|---|---|---|---|---|---|
| | 25 | 50 | 100 | 200 | 300 | 500 |
| 0.75 | 26.2 | 20.6 | 6.8 | 3.2 | 0 | 0 |
| 0.94 | 26.6 | 17.2 | 3.0 | 1.2 | 0 | 0 |
| 1.27 | 20.4 | 3.8 | 1.2 | 0 | 0 | 0 |
| 1.44 | 17.2 | 2.0 | 0 | 0 | 0 | 0 |
| 1.59 | 8.4 | 1.4 | 0 | 0 | 0 | 0 |

Control: 29.2.

TABLE 10

[In case of 25 mg./kg. of magnesium aluminate silicate is administered together]

| Carboxymethyl dextran (sodium salt) degree of substitution | Dose (mg./kg.) | | | | | |
|---|---|---|---|---|---|---|
| | 25 | 50 | 100 | 200 | 300 | 500 |
| 0.75 | 24.8 | 16.8 | 3.6 | 0.8 | 0 | 0 |
| 0.94 | 24.6 | 10.6 | 2.4 | 0 | 0 | 0 |
| 1.27 | 18.2 | 0 | 0 | 0 | 0 | 0 |
| 1.44 | 16.0 | 0 | 0 | 0 | 0 | 0 |
| 1.59 | 4.2 | 0 | 0 | 0 | 0 | 0 |

Control: 27.4.

In addition, we determined the acidity, free HCl, total acid and pepsin value of the gastric juice of Shay rats when 25 mg./kg. or 50 mg./kg. of a sodium salt of carboxymethyl dextran having [$\eta$] of 0.315 and a degree of substitution of 1.44 was administered, respectively, and when 25 mg./kg. or 50 mg./kg. of magnesium aluminate silicate was orally administered together with said sodium salt of carboxymethyl dextran, respectively, and there were obtained the results as illustrated in Table 11.

TABLE 11

| Dose (mg./kg.) | | Number of Ulcers | Gastric Juice (ml.) | pH | Free HCl (meq./l.) | Total Acid (meq./l.) | Pepsin Value (mg. as tyrosin) |
|---|---|---|---|---|---|---|---|
| Carboxymethyl dextran salt | Magnesium Aluminate Silicate | | | | | | |
| 0 | 0 | 30.2 | 12.8 | 1.3 | 60.5 | 95.6 | 21.8 |
| 25 | 0 | 24.4 | 11.7 | 2.1 | 58.5 | 106.2 | 21.0 |
| 50 | 0 | 10.8 | 12.7 | 2.1 | 42.6 | 83.6 | 19.6 |
| 25 | 25 | 17.2 | 11.2 | 2.5 | 55.1 | 95.1 | 21.7 |
| 50 | 25 | 2.0 | 11.0 | 2.5 | 41.6 | 71.9 | 19.2 |
| 25 | 50 | 16.0 | 11.2 | 2.8 | 48.6 | 86.4 | 19.5 |
| 50 | 50 | 0 | 11.9 | 2.8 | 38.0 | 69.3 | 17.2 |

From these reuslts, it is known that the pH in stomach was increased from 1.3 shown by the control group up to 2.5–2.8 by the administration of 25 mg. to 50 mg. of magnesium aluminate silicate and, moreover, the breakout of peptic ulcer is almost perfectly restrained in case 50 mg. of carboxymethyl dextran is administered within the said pH range.

According to the method of the present invention, therefore a restraining action on peptic ulcers can be revealed by oral administration of an effective dose consisting of at least one kind of the compound selected from the group which is composed of a carboxymethylated polysaccharide, most preferably having an intrinsic viscosity of at least 0.045 and a degree of substitution of at least 0.5, preferably 0.8, and the salt thereof. Particularly the object of restraining peptic ulcer can be more advantageously achieved by oral administration of still less amount of the effective dose which is composed of at least one kind of the said compound and an antacid. In this case, it is preferable to use the said antacid by an amount sufficient to control the pH of the gastric juice within a range of 2.0–4.0, preferably 2.5–3.5. In addition, although the amount of administration may be varied depending upon the conditions such as the presence or absence of an antacid, degree of controlling pH of the gastric juice, kind of carboxymethylated polysaccharide, period of administration and conditions of the patient, there can be employed, in general, an amount of administration of approximately 1.5–3.0 g./day for adult.

The composition of the present invention can be supplied in a medicinal form such as powders, granules, tablets, capsules or solutions. Further, they can be employed together with other medicines, in so far as a material which does not make a carboxymethylated polysaccharide or a salt thereof insoluble in the gastric juice or which such as protein, combines with said carboxymethylated polysaccharide or the salt thereof does not coexist.

In addition, when an antacid is employed together, a composition such as mentioned above may be orally administered at the same time, the desired action can be revealed in such a manner that an antacid is administered at first to adjust pH in the stomach, then said carboxymethylated polysaccharide or the salt thereof is orally administered, or that said carboxymethylated polysaccharide or the salt thereof is previously orally administered, and a suitable antacid is administered thereafter.

Furthermore, as a multilayer tablet, there may be employed such a tablet as the said carboxymethylated polysaccharide or the salt thereof is wrapped in with the said antacid.

According to the present invention, an effect on peptic ulcers can be revealed within a pH range, wherein the activity of pepsin is shown, of the gastric juice.

In addition, the said carboxymethylated polysaccharide or the salt thereof may be, in the present invention, administered least in an effective amount; however it can be administered by larger amount in so far as the toxicity is not revealed in practice.

In the present invention, there is mentioned referring to restraining peptic ulcer hereinbefore. It should be understood, however, that the material called a medicine for peptic ulcers in the present invention exhibits also an effect of preventing the breakout or prevention thereof.

In the examples mentioned below, there is illustrated an effect of restraining peptic ulcer of Shay rat when a carboxymethylated polysaccharide or a salt thereof or a combination of it with an antacid is orally administered in the form of solution.

Example 1

When 200 mg./kg. of free ether of carboxymethyl dextran having $[\eta]$ of 0.5 (as sodium salt) and degree of substitution of 1.8 was administered to five male rats of Wistar descent each having a body weight of approximately 200 g., the number of ulcers, illustrated as an effect of a peptic ulcers, was 0.2. On the other hand, the number for the control rates was 30.3.

Example 2

When each 30 mg./kg. of sodium salt of carboxymethyl cellulose having $[\eta]$ of 4.97 and a degree of substitution of 0.7 and free ether of carboxymethyl dextran having $[\eta]$ of 0.36 (as sodium salt) and a degree of substitution of 1.6 and 10 mg./kg. of magnesium oxide were orally administered simultaneously in combination, the number of ulcers, illustrated as an effect of restraining peptic ulcers of the Shay rats, was 0.2, while that of the rats for control was 30.5.

Example 3

When 60 mg./kg. of magnesium salt of carboxymethyl glycogen having $[\eta]$ of 0.206 (as sodium salt) and a degree of substitution of 1.1 and, 10 min. after, 35 mg./kg. of dried aluminum hydroxide gel were orally administered, the number of ulcers, illustrated as an effect of restraining peptic ulcers of the Shay rats, was zero. On the other hand, it was 30.3 for the control rats.

Example 4

When each 30 mg./kg. of sodium salt of carboxymethyl dextrin having $[\eta]$ of 0.19 and a degree of substitution of 1.2 and potassium salt of carboxymethyl amylopectin having $[\eta]$ of 1.31 and a degree of substitution of 0.63, 20 mg./kg. of ammonium salt of carboxymethyl starch having $[\eta]$ of 0.30 and a degree of substitution of 1.0 and 15 mg./kg. of sodium bicarbonate were orally administered in the same time, the number of ulcers, illustrated as an effect of restraining peptic ulcers of the Shay rats was zero. On the other hand, it was 29.8 for the control rats.

Example 5

When each 10 mg./kg. of hydroxide aluminum magnesium co-dried gel, synthetic aluminum silicate and magnesium aluminate silicate, and then 20 mins. after, 40 mg./kg. of sodium salt of carboxymethyl dextrin having $[\eta]$ of 0.129 and a degree of substitution of 1.23 and 30 mg./kg. of magnesium salt of carboxymethyl dextran having $[\eta]$ of 0.05 (as sodium salt) and a degree of substitution of 1.8 were orally administered, the number of ulcers, illustrated as an effect of restraining peptic ulcers of the Shay rats was zero. On the other hand, it was 28.0 for the control rats.

We claim:

1. A medicinal composition for the production of antipeptic activity in a patient with peptic ulcers containing an effective anti-peptic dose of at least one compound selected from the group consisting of carboxymethylated dextran, its sodium salts, potassium salts, calcium salts and ammonium salts, and an antacid.

2. The medicinal composition of claim 1 wherein the degree of substitution of said carboxymethylated dextran compound is at least 0.5.

3. The medicinal composition according to claim 1 wherein the intrinsic viscosity of the sodium salts of said carboxymethylated dextran is 0.045.

4. The medicinal composition of claim 1 wherein the antacid is contained in an amount sufficient to control the pH of the gastric juices within the range of 2.0 to 4.0.

5. The medicinal composition of claim 1 wherein the antacid is a member selected from the group consisting of magnesium oxide, calcium hydroxide, magnesium hydroxide, aluminum hydroxide, sodium bicarbonate, potassium bicarbonate, calcium carbonate, magnesium carbonate, magnesium silicate, aluminum silicate, sodium aluminate silicate, calcium aluminate silicate, magnesium aluminate silicate, aluminum hydroxide-magnesium carbonate coprecipitated compound, aluminum hydroxide-magnesium hydroxide coprecipitated compound, and aluminum hydroxide-magnesium carbonate-calcium carbonate coprecipitated compound.

6. A method of producing antipeptic activity in a patient with peptic ulcers comprising orally administering to said patient an effective anti-peptic dose of at least one compound selected from the group consisting of carboxymethylated dextran, its sodium salts, potassium salts, calcium salts, and ammonium salts.

7. The method according to claim 6 wherein the degree of substitution of said carboxymethylated dextran compound is at least 0.5.

8. The method of claim 6 wherein the intrinsic viscosity of the sodium salts of said carboxymethylated dextran is 0.045.

9. The method of claim 6 wherein an antacid is contained with the said carboxymethylated dextran in an amount sufficient to control the pH of the gastric juices within the range of 2.0 to 4.0.

10. The method of claim 6, wherein an antacid is orally administered to a patient in an amount sufficient to control the pH of the gastric juices within the range of 2.0 to 4.0 prior to the administration of the said carboxymethylated dextran.

(References on following page)

References Cited

UNITED STATES PATENTS

| | | | |
|---|---|---|---|
| 2,477,080 | 7/1947 | Necheles | 167—55 |
| 3,063,905 | 11/1962 | Novak | 167—65 |

ALBERT T. MEYERS, *Primary Examiner*

S. ROSEN, *Examiner.*

S. J. SINGER, *Assistant Examiner.*